United States Patent [19]

Haentjens

[11] 3,966,262

[45] June 29, 1976

[54] SUMP AND PUMP CONSTRUCTION FOR CONVEYING SOLIDS IN THE FORM OF A SLURRY

[76] Inventor: Walter D. Haentjens, Box 121, R.D. 1, Sugarloaf, Pa. 18249

[22] Filed: Mar. 24, 1975

[21] Appl. No.: 561,534

Related U.S. Application Data

[63] Continuation of Ser. No. 371,038, June 18, 1973, abandoned.

[52] U.S. Cl. .................................. 302/15; 415/183
[51] Int. Cl.² ................... B65G 53/30; B65G 53/36
[58] Field of Search ........................... 302/14–16; 299/12, 18, 64; 415/183; 417/900

[56] References Cited
UNITED STATES PATENTS

| | | | |
|---|---|---|---|
| 3,066,612 | 12/1962 | Haentjens | 415/183 |
| 3,260,548 | 7/1966 | Reichl | 299/18 |
| 3,704,041 | 11/1972 | Loveland et al. | 302/14 |

*Primary Examiner*—John J. Love
*Assistant Examiner*—Jeffrey V. Nase
*Attorney, Agent, or Firm*—Hill, Gross, Simpson, Van Santen, Steadman, Chiara & Simpson

[57] ABSTRACT

Apparatus for removing solids such as coal from the discharge end of a continuous mining machine in the form of a slurry. The apparatus includes an inner sump for water and mined coal to form a slurry. A high capacity pump is in the bottom of the inner sump and has a capacity sufficient to maintain a uniform level of water in the sump and to pump the heavier solids settling to the bottom of the sump. The mined coal is supplied to the inner sump to be formed into a slurry by the water kept in a state of high agitation by the entrance angle of the water and the coal discharged therein. An outer sump extends about and fully contains the inner sump and has side walls substantially higher than those of the inner sump to collect the overflow from the inner sump in the form of dirty water and fines. A low capacity pump takes the overflow of dirty water and fines.

6 Claims, 2 Drawing Figures

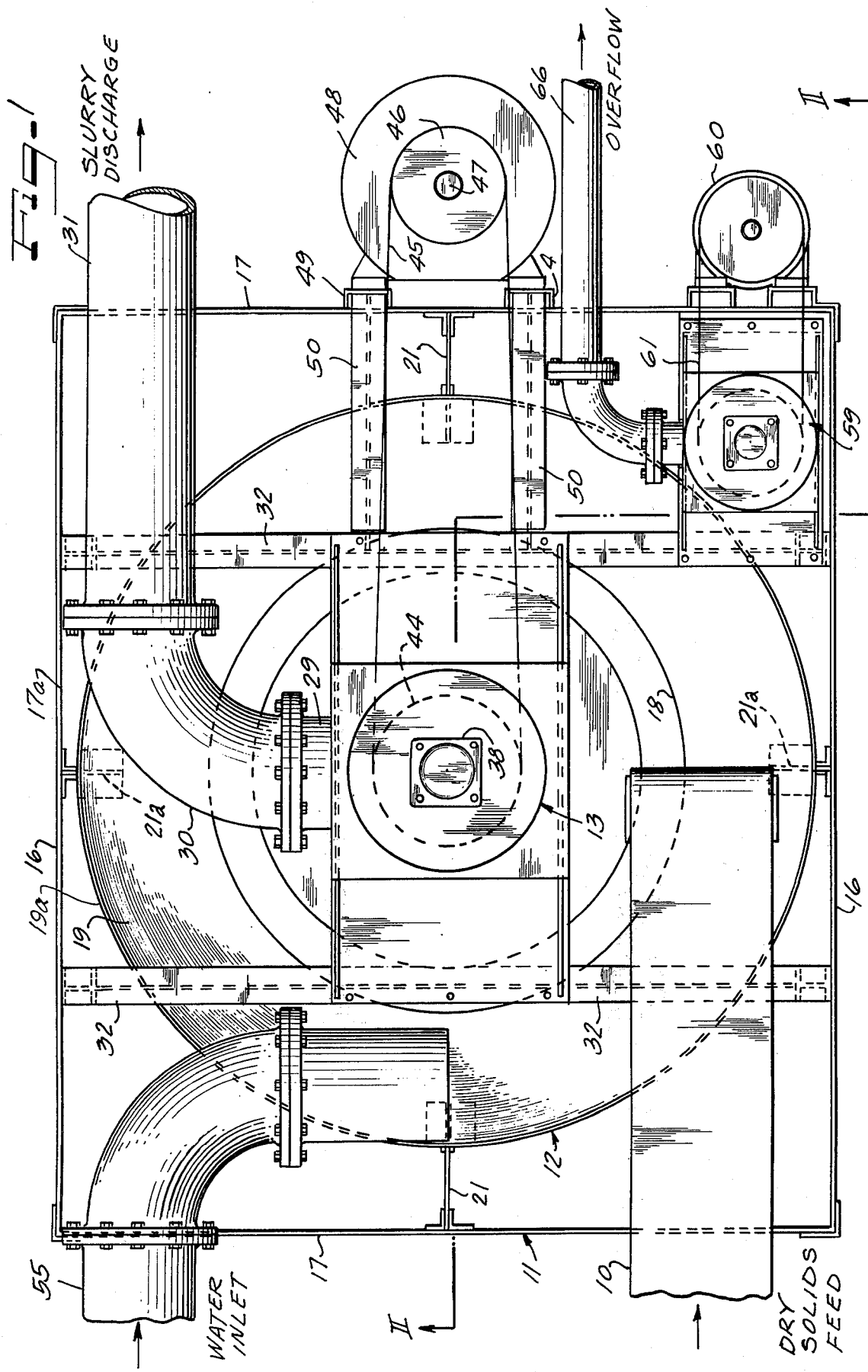

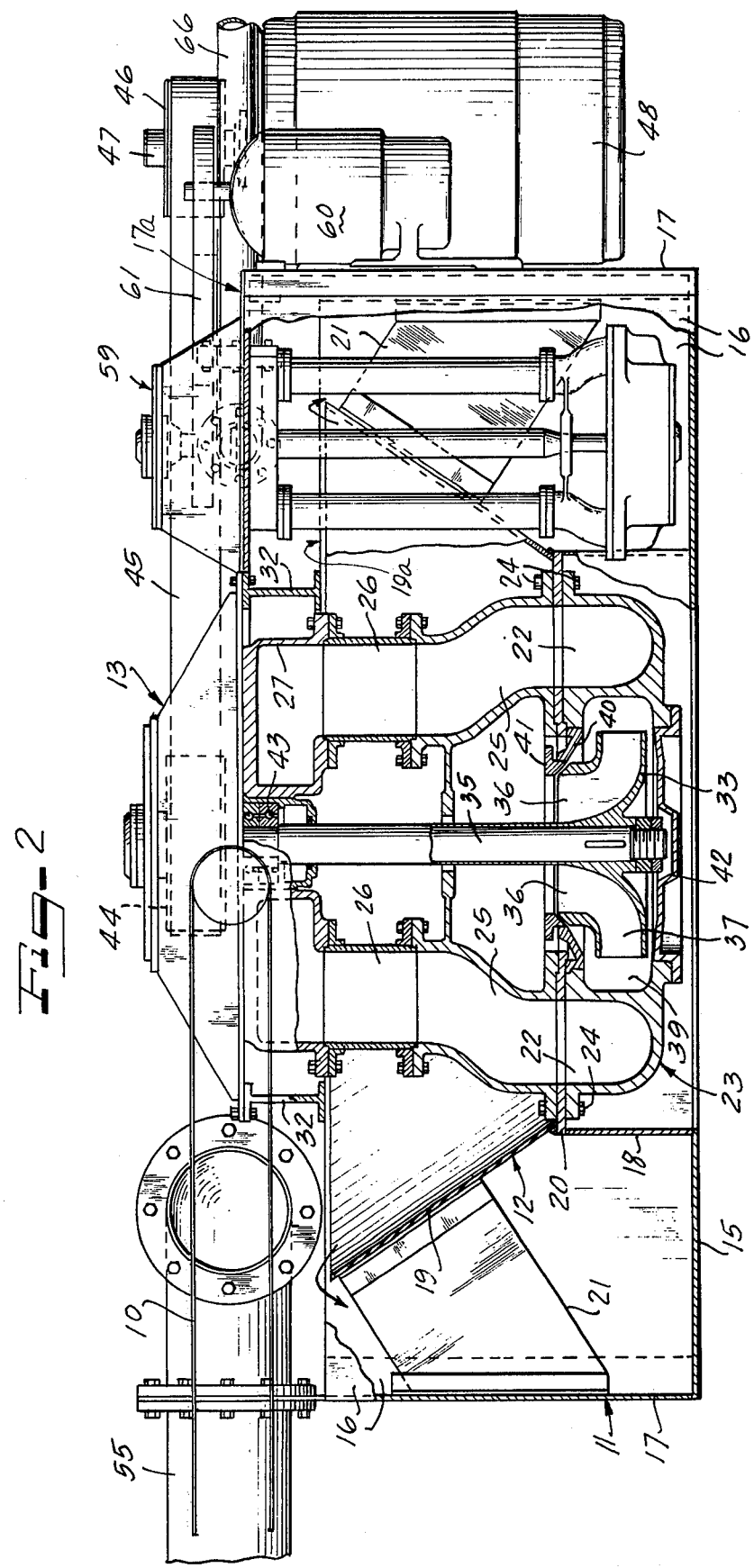

3,966,262

SUMP AND PUMP CONSTRUCTION FOR CONVEYING SOLIDS IN THE FORM OF A SLURRY

This is a continuation of application Ser. No. 371,038, filed June 18, 1973 and now abandoned.

FIELD OF THE INVENTION

This invention is in the field of conveying coal in the form of a slurry in a continuous operation as mined.

PRIOR ART, BACKGROUND, SUMMARY AND ADVANTAGES OF INVENTION

The U.S. Pat. No. to Reichl 3,260,548 shows an apparatus for transporting coal from a continuous mining machine in the form of a slurry. In this patent, the slurry is formed in the slurry preparation terminal following the mining machine and is pumped from this terminal to a tank in which the coal is removed from the bottom of the tank and conveyed to a crusher unit where it is again formed into a slurry and pumped from the mine.

U.S. Pat. Nos. 2,528,748; 2,920,635; 2,711,598; 3,690,730 and the British Pat. to Craven No. 599,284 all show various apparatus for transporting coal or other solids in the form of a slurry.

In the apparatus and system of the foregoing patents, it has been difficult to collect and transport solids in the form of a slurry, particularly those mined by continuous mining machines. Such mining machines can mine coal at rates as high as 600 tons per hour and the rate of mining may vary from zero to 600 tons per hour in very short intervals of time. With such a high rate of discharge of the coal, particularly where the fluctuation is as great as encountered in continuous miners, it has been extremely difficult to transport the solids from the machine at the rate of discharge from the machine. This is particularly the case where the machine is operating in low coal seams, where the entire slurry forming equipment must be designed for use in heights of between 5 and 5½ feet.

The solids discharged from the mining machine, when mixed with water at a solids to water ratio of approximately 30% by weight, result in a slurry of approximately 3500 G.P.M. If the solids could be uniformly fed to form the slurry, the conveying of the solids in the form of a slurry would be no problem, but where the flow of solids from the machine may rapidly fluctuate from zero to 600 tons per hour, it has not been practical to design controls permitting such a solids variation without overflowing the sump or letting the sump go dry at times.

The apparatus of the present invention cures the deficiencies of the prior art patents and slurry conveying systems by obviating the necessity of providing complicated mechanical controls, to take care of high solids fluctuations by providing an inner sump having a high capacity vertical slurry pump in the bottom of the sump and by surrounding the inner sump with an outer sump having side walls substantially higher than those of the inner sump. Both sumps are open at the top, and water is supplied to the inner sump at a constant rate equal to the pump capacity, so the sump level remains substantially constant without any addition of solids. The solids mined by the continuous mining machine are added to the inner sump. At any solids rate above zero, the inner sump will overflow to the outer sump, but the heavy solids and water will be drawn to the main pump and only dirty water and fines will overflow to the outer sump. A pump connected to the outer sump handles the overflow of dirty water and fines.

An advantage of this arrangement is that the removal of the slurry can be controlled without the use of complicated and expensive controls and the overflowing of the inner sump onto the mine floor is completely eliminated.

Another advantage of the present invention is the control of a slurry formed by water discharged into a sump at a constant rate and solids discharged into the sump at a fluctuating rate to eliminate spillage from the inner sump onto the mine floor, caused by the intermittent supply of coal to the slurry formed in the inner sump.

A further advantage of the present invention is the construction and arrangement of a sump permitting a high solids variation without overflowing the sump onto the ground or pumping the sump dry.

A further advantage of the invention is the constructing of a double sump for a vertical slurry pump eliminating the necessity of controls to handle a varying feed rate of solids to the slurry pump.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a plan view of a slurry pump and sump arrangement constructed in accordance with the principles of the present invention; and FIG. 2 is a vertical sectional view taken substantially along lines II—II of FIG. 1 with certain parts broken away.

DESCRIPTION OF PREFERRED EMBODIMENT OF INVENTION

In the embodiment of the invention illustrated in FIGS. 1 and 2 of the drawings, I have shown a slurry transportation system for continuously conveying the solids mined from a continuous mining machine in underground mining at the rate of delivery from the machine. The continuous mining machine may be of any well-known form discharging the dry mined solids onto a conveyor 10, so need not be shown or described herein. The system is shown as including an outer sump 11 and a fully contained inner sump 12 in spaced relation within said outer sump and shown as having a vertical slurry pump 13 having an inlet at the base thereof and extending above and below said base.

The outer sump 11 includes a base 15 having enclosing walls provided by side walls 16 and end walls 17 having a top edge 17a projecting upwardly therefrom to a substantial distance above the top of the inner sump 12, to take care of the overflow from said inner sump and to prevent the spilling of the highly agitated slurry onto the mine floor as solids are delivered to the inner sump by the conveyor 10. The inner sump 12 includes a continuous upstanding inclined wall 19 diverging from a base plate 20 and together with said base plate forms a sump in the form of an inverted frustum of a cone, there being a top edge 19a which is located a substantial distance below the outer sump top edge 17a.

The base plate 20 is shown in FIG. 2 as being annular in form and supported along its periphery on a cylindrical wall 18 extending upwardly from the base 15. The plate 20 forms a mounting for the inclined wall 19 and for an impeller casing 23 for the pump 13. The inner sump is further supported and braced to the outer sump 11 by gusset-like support and bracing members 21 extending angularly inwardly and upwardly from the end walls 17 of the outer sump to the inner sump and similar support and bracing members 21a extending inwardly and angularly upwardly from the side walls 16 of the inner sump to the frustoconical outer sump.

The base plate 20 is of a generally annular form and has openings therein in alignment with discharge outlets 22 leading from an impeller casing 23 for the pump and supplying fluid discharged from the pump through the impeller casing. The impeller casing 23 is flanged adjacent the support plate 20 and is bolted thereto as by bolts 24, bolting the impeller casing 23 to depend from the plate 20. Discharge passageways 25 in the form of a conduit frame have communication with aligned passageways 26 leading to a manifold 27, having communication with a discharge pipe 29 connected with an elbow 30. The elbow 30 has fluid connection with a slurry discharge pipe 29 which may be connected with other piping 31 leading from the mine. The manifold 27 and pump 13 are further shown as supported on I-beams 32, extending between the side walls 16 of the outer sump 11 and welded or otherwise secured thereto.

The pump 13 may be a top inlet cantilevered shaft vertical pump of a type manufactured and sold by Barret, Haentjens & Co. - Hazleton, Pennsylvania and of a conventional form well-known to those skilled in the art, so not herein shown or described in detail. The pump, in addition to the impeller casing 23, manifold 27 and passageways 25 and 26 leading from said casing 23 to the manifold 27 includes an impeller 33 keyed or otherwise secured to the lower end of an impeller shaft 35. The impeller 33 has inlets 36 leading thereinto, opening upwardly to draw the slurry including large size particles into the pump from the bottom of the inner sump 12. The inlets 36 lead to radial discharge passageways 37 drawing in and forcing the slurry including relatively large particles of coal and rock, along a volute chamber 39 leading to the discharge passageways 22, for forcing the slurry upwardly along said passageways to the manifold 27, for discharge through the outlet fitting 29. The impeller 33 is sealed to the casing 23 as by a suitable annular seal 40 cooperating with an annular seal 41, forming an enlarged diameter inlet to the inlets 36 for the impeller. The seals and inlet need not herein be shown or described further since they have been commonly used in pumps of the class described. The bottom of the casing 23 is closed by a bottom plate 42 bolted or otherwise secured thereto and removable to accommodate cleaning of the pumping chamber 39.

The shaft is suspended adjacent its upper end portion on a pair of anti-friction bearings 43, which may be radial and axial thrust bearings of a known form, and may be journalled at its upper end in a top cover plate and bearing housing 38 for the pump. A drive pulley 44 is keyed or otherwise secured to the shaft 35. The pulley 44 may be a multiple groove pulley for a series of V-belts 45 driven from a multiple groove pulley 46 on the upper end of a shaft 47 for a drive motor 48. Alternately, a chain drive may be employed. Said motor is suitably supported on an outer end wall 17 for the outer sump 11 on channels 49 braced to the I-beams 32 as by parallel spaced I-beams 50, as shown in FIG. 1.

An inlet 55 for water leads through an end wall 17 of the outer sump and is arranged to discharge water into the inner sump 12 at a constant rate of flow. The pump 13 has a capacity equal to the flow of water into the inner sump to maintain the level of the water in the inner sump at a constant level. In order to form a slurry and efficiently carry away the solids discharged into the inner sump and maintain a constant level of water in the inner sump 12, the pump 13 may have a capacity of substantially 3500 G.P.M.

The dirty water and fines are carried away from the outer sump by a vertical pump 59 supported to position its inlet close to the bottom of the outer sump. The pump 59 may be like the pump 13, but may have a capacity of approximately 500 G.P.M. to take care of the overflow from the inner sump into the outer sump caused by the maximum flow of solids into the inner sump, that is, 600 tons per hour of coal and is sized to handle the overflow from an equivalent volume of dry solids. The pump 59, like the pump 13, has a vertical impeller shaft driven from a motor 60 mounted on the outside of an end wall 17 of the outer sump in a manner similar to which the motor 48 is mounted on the outside of the end wall 17. The drive from the motor 60 to the outer pump 59 is through a multiple V-belt drive 61.

Continuous mining machines of the type supplying mined coal to the inner sump 12 while having a capacity as high as 600 tons per hour, are intermittently operated as the machine advances with the result that the rate of discharge from the conveyor 10 into the inner sump 12 may fluctuate from zero to 600 tons per hour and this fluctuation in rate of discharge of the coal may occur quite rapidly. Therefore, as the pump 13 maintains a constant level of water in the inner sump and solids are supplied to the inner sump at a rate above zero, the inner sump will overflow to the outer sump. All of the heavy solids, however, will be drawn to the main pump and only dirty water and fines will overflow to the outer sump.

While the double sump and pump arrangement of the present invention is not shown as mobile, it must be advanced as the continuous mining machine is advanced, so the volume of the inner sump must be relatively small to prevent the inner and outer sumps from becoming unduly bulky. Where used in conveying coal mined from a working face of a mine by a continuous mining machine, the entire height of the inner and outer sumps including the pump 13 and water inlet 55 should not be over 5 feet, and with the small volume inner sump, if it were not for the outer sump, there would be considerable splashing and overflow, which cannot be tolerated in the working area of a mine.

In order to move the double sump unit to advance the unit with the mining machine, the unit may be mounted on a skid (not shown) and may be advanced with the mining machine by a hoist or other advancing means or may be mounted on continuous traction tread devices extending along opposite side walls 16 of the outer sump 11. The skid or traction tread devices and means for advancing the sump with the continuous mining machine is not herein shown or described since it may be of various well-known forms and is no part of the present invention.

As previously mentioned, the inner pump in the bottom of the sump 12 is capable of handling large particles of coal and rock, which may be 4" across, and with the discharge of such particles into the relatively small frusto-conical inner sump 12, there is a high degree of agitation in the inner sump which makes it extremely difficult to control the level in the inner sump and prevent overflowing thereof. Moreover, the pump 13 besides handling such large particles of coal or rock must maintain constant flow in the slurry discharge line to prevent settling of the particles and blocking of the discharge line.

It should further be understood that the double sump arrangement shown and described herein assures that the pump handling the large particles, will not run out of water or slurry. The running out of water for the smaller pump, however, is of minimal importance since this pump handles only the overflow of water and fine particles from the inner sump, and the intermittent drawing in of air and water of the failure to have any flow at all is of very little consequence for the small pump and flow line leading therefrom. The small pump 59 has a discharge line 66 which may be run to the terminal point of the main discharge line 31.

It should, therefore, be understood that the control of the level of the sump is attained by matching the capacity of the pump in the inner sump to the rate of discharge of water into this sump, so water overflows only the inner sump as solids are discharged thereinto, and by collecting the overflow of dirty water and fines from the inner sump in the outer sump caused by the discharge of solids into the inner sump, and that this control avoids the necessity of complicated flow and water level controls, and makes it practical to convey large particles of solids in the form of a slurry and supplied to the inner sump in the form of dry solids at a widely fluctuating rate, without overflowing onto the mine floor.

I claim as my invention:

1. In an apparatus for conveying solids supplied in the form of dry solids at fluctuating rates and suitable for transportation in the form of a slurry,
    an outer sump having upstanding containing walls,
    an inner sump fully contained within said outer sump and having upstanding containing walls spaced inwardly of said upstanding containing walls of said outer sump,
    a conveyor conveying dry solids to said inner sump,
    a pump having an inlet in direct communication with the bottom of said inner sump,
    a supply line for water leading to said inner sump, supplying water thereto at a rate substantially equal to the capacity of said pump, to maintain a constant level of water in said inner sump and create a vigorous agitation of water and solids in said inner sump to form a slurry,
    said containing walls of said outer sump providing a top edge extending substantially uniformly to a higher elevation than an edge defining the top of said inner sump walls and collecting the overflow of dirty water and fines from said inner sump caused by the discharge of solids into said inner sump, and
    a pump for said outer sump having a capacity sufficient to take care of the overflow of water from said inner sump caused by the discharge of solids thereinto, for continuously removing the water and fines from said outer sump.

2. The apparatus for conveying solids of claim 1, wherein the pump for said inner sump is a continuously operating pump of a high capacity capable of forming and handling a slurry of large particles of rock and fines and wherein the pump for the outer sump is of substantially less capacity than the pump for the inner sump for handling the overflow of dirty water and fines from said inner sump caused by the discharge of large particles of rock and fines into the inner sump and serves to remove the overflow of water and fines overflowing from the inner sump into the outer sump.

3. The apparatus for conveying solids in the form of a slurry in accordance with claim 2, wherein the inner sump is frusto-conical and has a continuous side wall diverging outwardly and upwardly from the inlet to the pump for said inner sump, wherein the outer sump has side walls extending above the side walls of said inner sump to a substantially higher elevation than the elevation of the top of the side walls of said inner sump, and extending entirely about said inner sump to effectively collect the overflow from said inner sump and avoid the spillage of water over the side walls of said outer sump.

4. The apparatus for conveying solids in the form of a slurry of claim 1, wherein the pump having an inlet in direct communication with the bottom of the inner sump is a continuously operating pump of a high capacity and forms the bottom of the inner sump and wherein the pump for the outer sump is mounted in the outer sump and is of less capacity than the pump forming the bottom of the inner sump and serves to handle the dirty water and fines overflowing said inner sump and caused by the discharge of large particles and fines into the inner sump.

5. The apparatus for conveying solids in the form of a slurry of claim 4, wherein the pump forming the bottom of the inner sump is in said inner sump and has an inlet in direct communication with the bottom of said inner sump and has a capacity equal to the supply of water to the inner sump through the supply line for water leading to the inner sump, to maintain a constant level of water in the inner sump and create a vigorous agitation of water and solid particles in said inner sump to form a slurry.

6. In an apparatus for forming solids mined at fluctuating rates into a slurry and conveying the solids in a continuous operation,
    an inner sump having a bottom,
    a solids inlet into said inner sump,
    a water inlet into said inner sump discharging water into said inner sump at a constant rate of flow,
    a pump having an inlet opening to the bottom of said inner sump and having a capacity equal to the flow of water into said inner sump, and establishing a vigorous agitation in said inner sump,
    an outer sump extending about and fully containing said inner sump and having a bottom adjacent to said inner sump bottom,
    a pump for said outer sump adapted to carry away the overflow from said inner sump,
    the pump for said outer sump having a capacity sufficient to discharge dirty water and fines overflowing said inner sump caused by a maximum discharge of dry solids into said inner sump, making it practical to convey large particles of solids in the form of a slurry and supplied to the inner sump in the form of dry solids at widely fluctuating rates, without overflowing onto the mine floor, and said inner sump having generally upstanding enclosing walls spaced from upstanding enclosing walls of the outer sump;

said outer sump side walls providing a continuous top edge spaced upwardly substantially higher than the top edge of said side walls of said inner sump whereby to assure collection of vigorously agitated slurry overflowing said inner sump as solids are discharged into said inner sump.

* * * * *